United States Patent [19]

Lane et al.

[11] Patent Number: 4,807,152
[45] Date of Patent: Feb. 21, 1989

[54] METROLOGICAL APPARATUS

[75] Inventors: Hugh R. Lane, Leicester; Peter D. Onyon, Loughborough, both of United Kingdom

[73] Assignee: Rank Taylor Hobson Limited, England

[21] Appl. No.: 20,436

[22] Filed: Mar. 2, 1987

[30] Foreign Application Priority Data

Mar. 4, 1986 [GB] United Kingdom ................ 8605324

[51] Int. Cl.⁴ ........................... G01B 5/00; G01B 7/00
[52] U.S. Cl. ..................................... 364/513; 364/560; 364/474.37; 318/578; 33/1 M; 33/503; 33/169 R; 901/10; 901/44
[58] Field of Search ................ 364/474, 475, 167–171, 364/513, 560; 901/9, 10, 44, 46; 318/568, 578; 33/1 M, 1 N, 169 R, 503

[56] References Cited

U.S. PATENT DOCUMENTS

| | | | |
|---|---|---|---|
| 3,727,119 | 4/1973 | Stanley et al. | 901/44 |
| 3,741,659 | 6/1973 | Jones, Jr. | 33/169 |
| 4,080,741 | 3/1978 | Siddall et al. | 33/503 |
| 4,097,996 | 7/1978 | Yamazawa et al. | 33/503 |

(List continued on next page.)

FOREIGN PATENT DOCUMENTS

| | | |
|---|---|---|
| 0068082 | 11/1986 | European Pat. Off. . |
| 2654839 | 3/1976 | Fed. Rep. of Germany . |
| 8102627 | 9/1981 | PCT Int'l Appl. . |
| 528442 | 8/1976 | U.S.S.R. . |
| 1401034 | 7/1975 | United Kingdom . |
| 1461839 | 1/1977 | United Kingdom . |
| 1477508 | 6/1977 | United Kingdom . |
| 1575293 | 9/1980 | United Kingdom . |
| 1586014 | 3/1981 | United Kingdom . |
| 2067762 | 7/1981 | United Kingdom . |
| 2094478 | 9/1982 | United Kingdom . |
| 2099606 | 12/1982 | United Kingdom . |
| 2106252 | 4/1983 | United Kingdom . |
| 2107874 | 5/1983 | United Kingdom . |
| 2112140 | 7/1983 | United Kingdom . |
| 2141233 | 12/1984 | United Kingdom . |
| 2172707 | 9/1986 | United Kingdom . |
| 2174216 | 10/1986 | United Kingdom . |

OTHER PUBLICATIONS

Tsukada et al, "A Basic Research on Measurement of Cylindrical Form Errors by Noncontact Detector", Bull. Japan Soc. of Prec. Engg., vol. 14, No. 1 (Mar. 1980) pp. 49, 50.
Tsukada et al, "Measurement of Cylindrical Form Errors Using a Non-Contact Detector", Precision Engineering pp. 153–158, Jul. 1982 vol. 4, No. 3.

Primary Examiner—Allen MacDonald
Attorney, Agent, or Firm—Lerner, David, Littenberg, Krumholz & Mentlik

[57] ABSTRACT

Metrological apparatus, particularly for measuring form, has a turntable 4 and a transducer 14 and associated stylus 12 mounted so that the tip 12a of the stylus is displaceable radially and vertically relative to the turntable 4. The problem of obtaining both high resolution and large range of operation is solved by using a transducer/stylus 12,14 having a resolution of 12 nanometers and a range of only 0.4 mm and mounting the transducer 14 on an arm 10 which is driven radially and/or vertically by a computer 30 in response to the output from the transducer 14 to cause the stylus 12 to follow the workpiece surface. High resolution data defining the rotary position of the turntable 4 and the radial and vertical position of the transducer 14 is provided by a photodetector/optical grating arrangement 23, 21, 31; 27, 19, 43 and associated interpolators 42, 44, 46. A novel computer architecture comprising a host 22, master 30 and slaves 33, 35, 37 provides an efficient system for controlling the apparatus and gathering data. Efficient gathering of data is further assisted by the provision of means to cause the stylus 12 to traverse the surface of the workpiece at a constant speed, particularly as a function of the radial position of the transducer.

38 Claims, 6 Drawing Sheets

U.S. PATENT DOCUMENTS

| | | | |
|---|---|---|---|
| 4,118,871 | 10/1978 | Kirkham | 364/560 |
| 4,158,258 | 6/1979 | McKechnie | 33/521 |
| 4,167,066 | 9/1979 | Cooper et al. | 33/174 P |
| 4,215,299 | 7/1980 | Edwin et al. | 901/10 |
| 4,283,669 | 8/1981 | Jacoby | 318/578 |
| 4,455,755 | 6/1984 | Fritsche et al. | 33/174 L |
| 4,483,079 | 11/1984 | Band et al. | 33/1 M |
| 4,483,293 | 11/1984 | Minuccigni et al. | 364/513 |
| 4,581,062 | 9/1985 | Kada et al. | 364/513 |
| 4,587,622 | 5/1986 | Herzog | 364/561 |
| 4,621,434 | 11/1986 | Hirschmann | 33/503 |
| 4,630,215 | 12/1986 | Graham, Jr. | 364/474 |
| 4,631,834 | 12/1986 | Hayashi et al. | 33/503 |
| 4,653,011 | 3/1987 | Iwano | 364/513 |
| 4,663,852 | 5/1987 | Guarini | 33/1 M |
| 4,665,739 | 5/1987 | Mizuno | 73/105 |
| 4,679,331 | 7/1987 | Koontz | 33/503 |
| 4,691,446 | 9/1987 | Pitches et al. | 33/516 |
| 4,702,013 | 10/1987 | McMartry | 33/503 |
| 4,702,652 | 10/1987 | Rokksku | 364/474 |

METROLOGICAL APPARATUS

This invention relates to metrological apparatus and is especially concerned with apparatus for measuring form, such as roundness and straightness, or errors therein.

A known metrological apparatus comprises a rotatable member for receiving a workpiece, first drive means for rotating said member, a sensor for sensing the surface of a workpiece on the rotatable member during rotation thereof, means supporting said sensor for movement relative to said workpiece receiving member, second drive means for effecting said movement of said sensor, and digital computer means arranged to receive signals derived from said sensor for providing metrological data.

In use of the known apparatus, a workpiece is positioned on the rotatable support, a centring and levelling operation carried out if necessary, and form measurements made by rotation of the workpiece so that the sensor traverses the surface thereof. As the sensor traverses the workpiece surface, it outputs a signal which varies as a function of the form of the workpiece. During the measurement of form, the sensor is subject to the conflicting requirements of high resolution to enable it to detect the minutest variations in form, for example a resolution to better than 20 nanometers, and a wide range of operation enabling relatively large features of form to be accommodated. Thus, the ideal sensor would comprise a stylus and transducer such that the transducer outputs a signal which is linearly related to the movement of the stylus over a distance of at least several millimeters and preferably very substantially more but with the above mentioned high resolution throughout its range of operation. Up to the present time, it has not been possible to produce a transducer which satisfactorily meets these requirements. As a consequence, measurement of form has been a relatively slow and cumbersome procedure requiring the operator repeatedly to reposition the sensor in order to accommodate large features of form.

A further problem with the prior art apparatus is that the centring and levelling operation is necessarily difficult due to the limited range of operation of the transducer. In particular, before centring and levelling can be completed, it is necessary to ensure that the workpiece is so positioned on the workpiece receiving member that any centring errors are within the range of the transducer. This positioning has to be done by eye. In the event that these centring errors are not within the range of operation of the transducer and the centring operation is begun, it will be necessary to interrupt the centring operation and either reposition the surface sensor or reposition the workpiece. Thus, this operation is also time consuming and cumbersome.

One of the objects of the invention is to solve the above problems.

In one aspect, the invention solves the above problem in that the computer means is operable to control relative movement between the workpiece and the sensor in response to the signals derived from the sensor such that said sensor follows said workpiece surface and to provide said metrological data in dependence both on said signals and on said movement of said sensor.

Thus, in this way, a sensor having extremely high resolution, such as a resolution of better than 20 nanometers, preferably 12 nanometers, but a small range of operation, such as less than 0.4 mm, can be employed to enable the sensing of the minutest variations in form, whilst large features of form can be accommodated by the actuation of the drive means under control of the digital computer, and the derivation of the metrological data is both in dependence upon the transducer output and in dependence upon the movement of the sensor. The position of the sensor should therefore be determinable also with high resolution although in practice it is not necessary that this resolution be so high as that provided by the sensor itself. Thus, for example, whilst as already indicated the sensor should preferably have a resolution to better than 20 nonometers the resolution to which the position of the sensor may be determined when moved by the second drive means might only be to better than say 500 nanometers, preferably to say 200 nanometers but even this is an improvement of at least an order of magnitude compared to prior art apparatus.

The size of the features which can be accommodated by movement of the sensor will depend upon the range of movement of the sensor. In practice, the sensor may be movable at least 100 mm in the radial direction and at least 100 mm in the axial direction. In a preferred specific example, the sensor is movable radially through a distance of 200 mm and axially through a distance of 500 mm.

The invention is described further by way of example with reference to the accompanying drawings in which.

Figure 1:
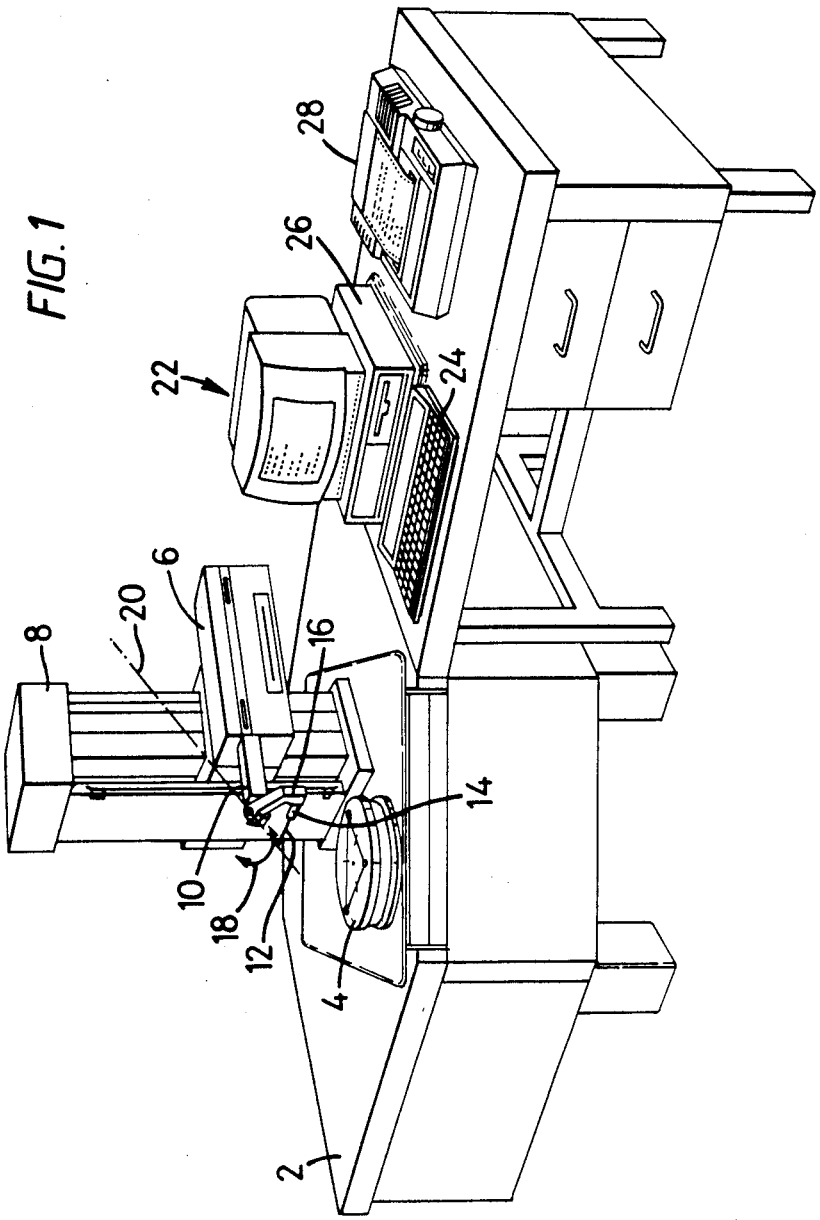
FIG. 1 is a perspective view of metrological apparatus according to an embodiment of the invention.

With reference to FIG. 1, metrological apparatus comprises a bench 2 provided with a turntable 4 for supporting a workpiece (not shown). A carriage 6 is supported for vertical movement on a column 8 and carries a horizontally movable arm 10. A stylus 12 for engaging the surface of the workpiece is comprised in a linear transducer 14, which may be inductive or capacitative for example, which is carried on one end of an arm 16 whose other end is attached to the free end of the arm 10 for pivotal movement, in the direction shown by arrow 18, about an axis 20 which is at 45° to the horizontal.

Figure 2:
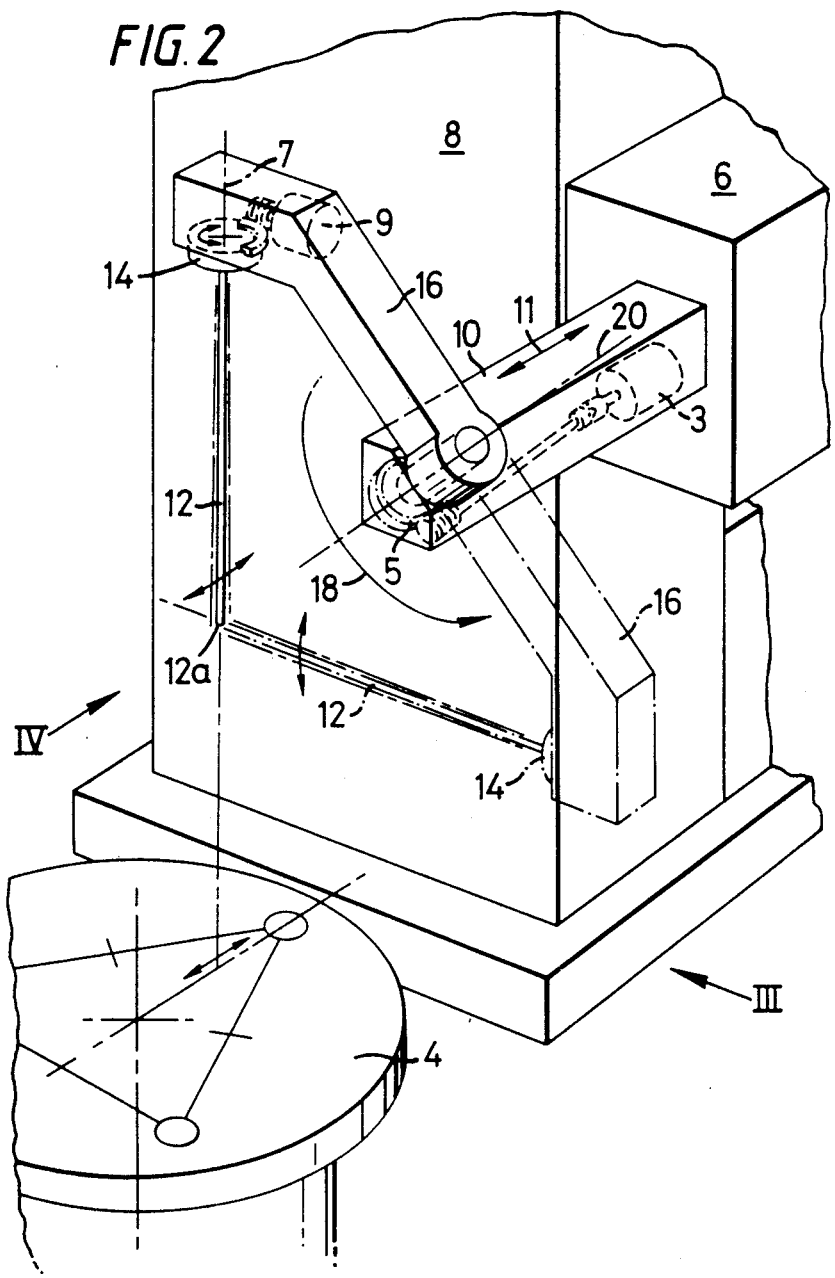
FIG. 2 is a perspective view showing part of the apparatus of FIG. 1 in more detail.

As best seen in FIG. 2, the arm 16 is pivotable through 180° about the axis 20 between the end positions shown in FIG. 2 in full and chain dotted lines respectively. In the full line position, the stylus 12 is vertical and in the broken line position the stylus 12 is horizontal. The arrangement is such that the tip of the stylus 12a is located in substantially the same position in a radial plane of the turntable 4 when the arm 16 is in either of the two positions shown in FIG. 2. An electric motor 3 mounted in the arm 10 is coupled to the arm 16 through a worm and wheel transmission 5 for driving the arm 16 between its two end positions. The stylus 12 and transducer 14 are arranged so that the stylus 12 can be deflected relative to the transducer 14 in only one direction. However, the transducer 14 is mounted in the arm 16 for rotation about an axis 7, preferably through 270° in 30° steps. Thus, for example, if the transducer 14 is rotated about axis 7 through 90° this changes by 90° the plane within which the stylus 12 is deflectable. A motor 9 is mounted in the arm for effecting rotation of the transducer 14. When the arm 16 is in the full line position shown in FIG. 2 with the stylus 12 vertical, for example for sensing an internal surface of a workpiece placed on the turntable 4, the transducer 14 will generally be maintained in a position in which the stylus 12 is deflectable in a radial plane relative to the turntable 4. However, when the arm 16 is in the broken line position shown in FIG. 2 with the stylus 12 horizontal, the transducer 14 may be rotated either to the position in which the stylus 12 is deflectable in a horizontal plane or to a position in which the stylus 12 is deflectable in a vertical plane. In the former position, a side surface of a workpiece may conveniently be sensed and in the latter position an upwardly facing surface may conveniently be sensed. Surfaces facing in other directions may be sensed by rotating the transducer 14 about axis 7 to a position in which the stylus 12 is deflectable in a plane generally normal to the surface to be sensed.

Figure 3:
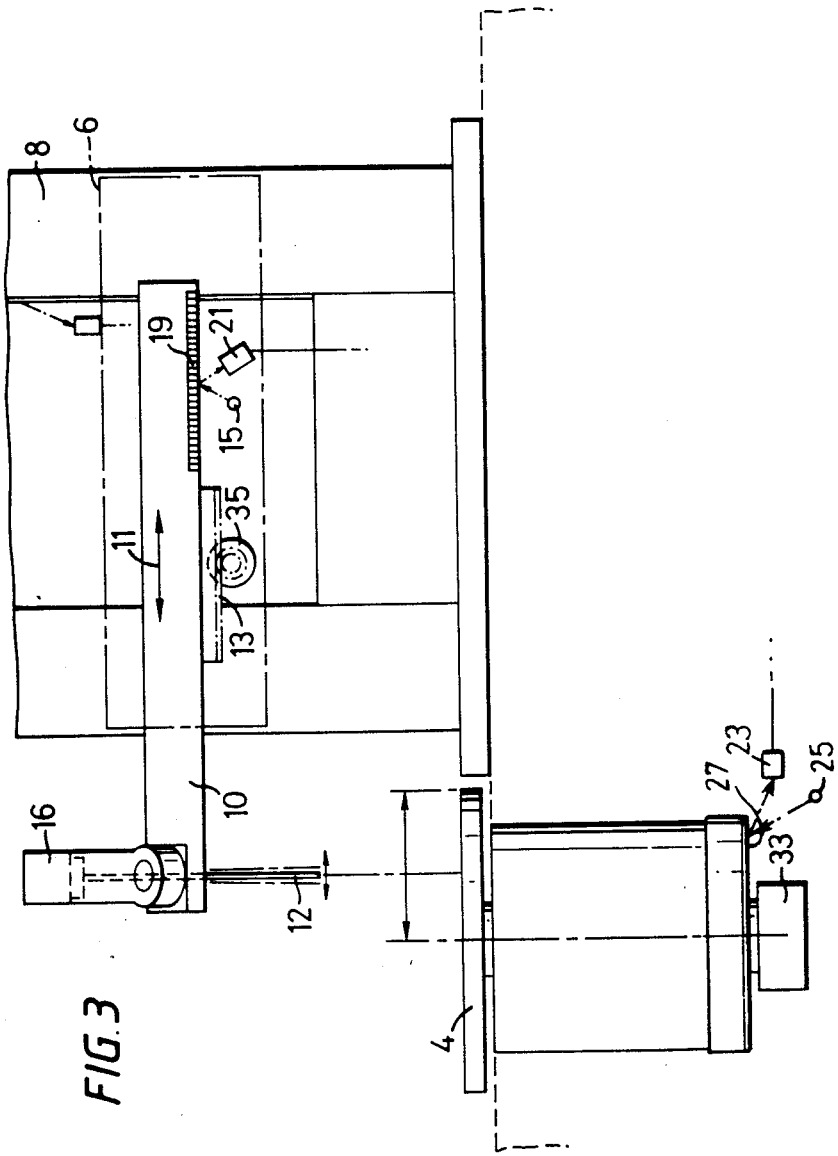
FIG. 3 is an elevation in the direction of arrow III of FIG. 2.

As seen in FIG. 3, a motor 35 is provided in the carriage 6 for driving the arm 10 in the horizontal direction indicated by arrow 11, drive being transmitted from the motor 35 to the arm 10 through a rack and pinion arrangement 13 or other suitable means such as a ball screw. Movement of the arm 10 in the direction of arrow 11 causes the transducer 14 to be moved horizontally so that the tip 12a of the stylus 12 is moved radially inwardly or outwardly relative to the axis of the turntable 4, the tip 12a remaining in the radial plane throughout this movement. Light from a source 15 mounted in the carriage 6 is directed towards a linear optical grating 19 carried by the arm 11 and reflected therefrom to a phototransducer 21 which provides output signals, preferably quadrature signals, from which the position and velocity of the arm 11 can be derived. As also seen in FIG. 3, a further phototransducer 23 provides signals from which the position and rotational velocity of the turntable 4, which is driven by a motor 33, can be derived with the aid of a light source 25 and optical grating 27 movable with the turntable 4.

Figure 4:
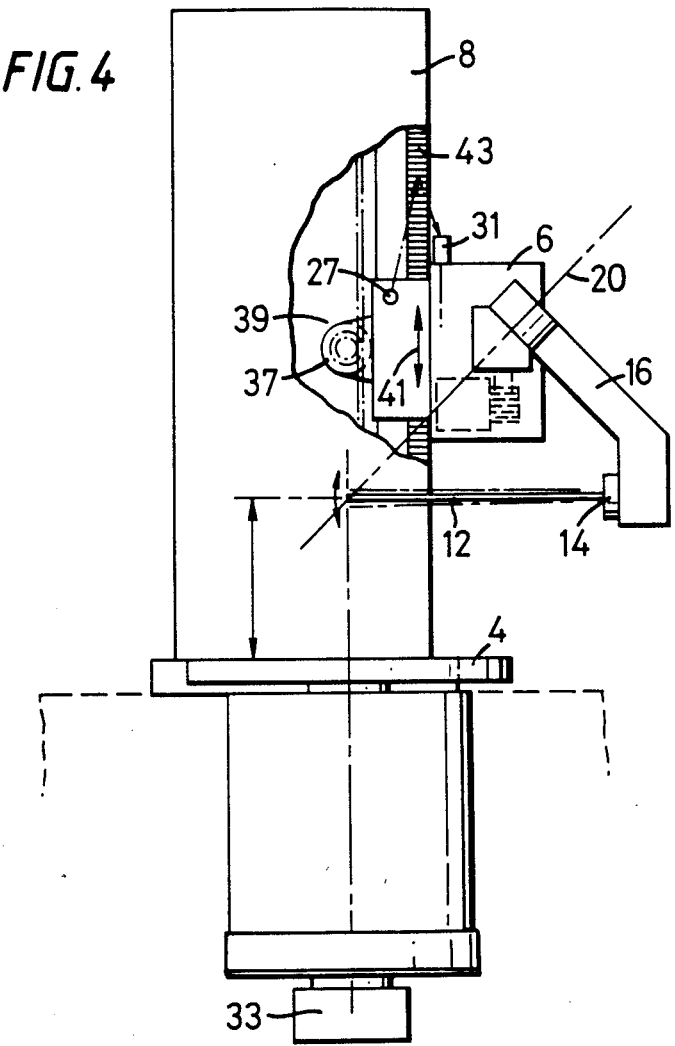
FIG. 4 is an elevation in the direction of arrow IV of FIG. 2.

As seen in FIG. 4, a motor 37 carried by the carriage 6 cooperates with a rack and pinion arrangement 39 (or other suitable means such as a sprocket wheel and chain) for driving the carriage 6 vertically in the direction of arrow 41. A constant force spring (not shown) is provided for counterbalancing movement. A further optical grating 43 mounted in the column 8 reflects light from a source 27 carried by the carriage 6 to a phototransducer 31 also carried by the carriage 6 so that the transducer 31 may provide signals, preferably quadrature signals, from which the position and speed of movement of the carriage 6 may be derived.

Figure 5:
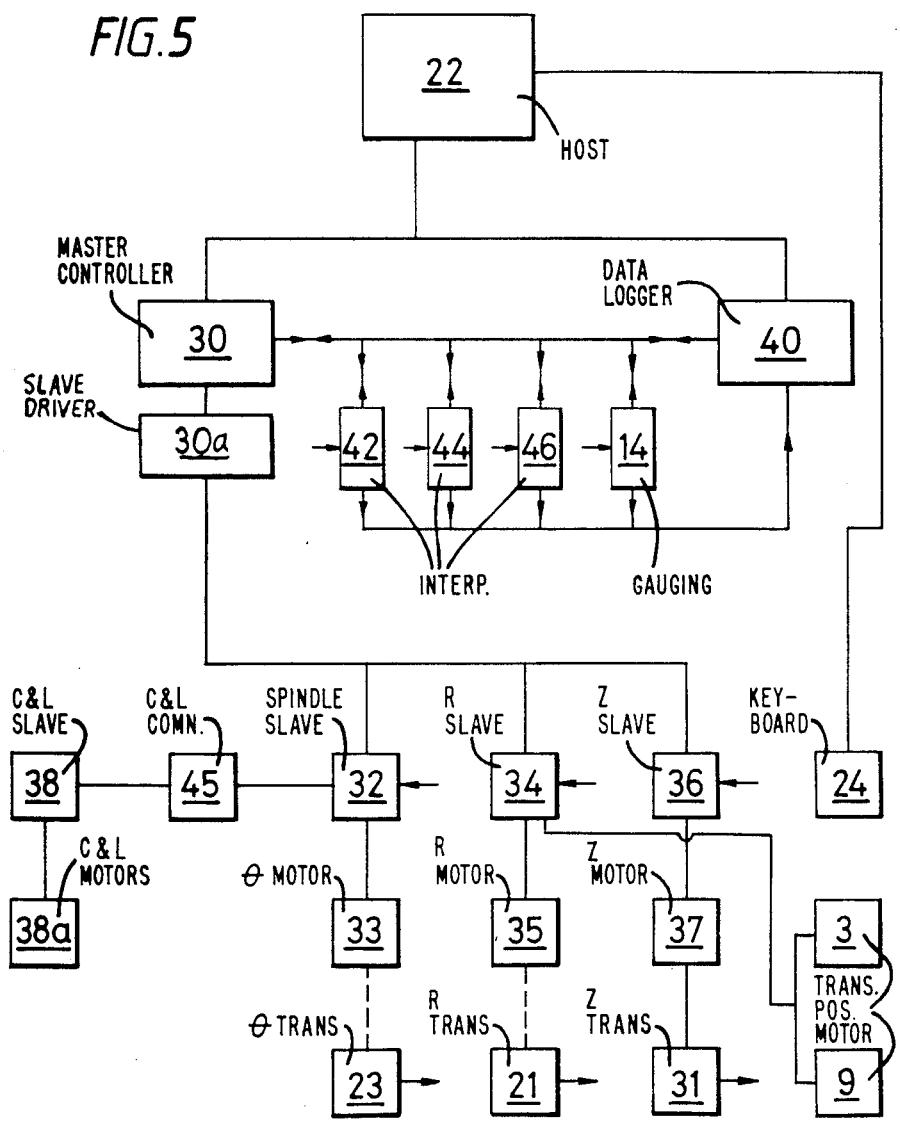
FIG. 5 is a block diagram illustrating a computer sysem incorporated in the apparatus of FIG. 1.

As seen in FIGS. 1 and 5 a host computer 22, which is provided with a keyboard 24, disc drive 26 and printer 28, is located on the bench 2 and is used for controlling the metrological apparatus, processing the measurements obtained and outputting the required metrological data. The host computer may, for example, be an IBM compatible PC.

As shown in FIG. 5, the apparatus includes a number of microprocessors 30, 32, 34, 36, 38 and 40. Microprocessor 30 is used as a master controller and receives instructions from the host 22 as to the operations which are to be performed by the apparatus. Such instructions are stored by the master controller 30 which, in accordance with programs stored in memory associated with the master controller, instructs and controls the remaining microprocessors, via a slave driver processor 30a, as to the action to be taken in order to carry out the instructions supplied by the host 22. Each of the remaining microprocessors also has memory associated with it storing the routines necessary for the performance of the instructions received from the master controller 30. Thus, microprocessors 32, 34, 36 and 38 are designated as slaves.

Slave 32 controls the speed of rotation of the turntable 4. Slave 34 controls radial movement of the arm 10. Slave 36 controls vertical movement of the carriage 6. Slaves 32, 34 and 36 all preferably control the speeds of the respective motors 33, 35 and 37 in accordance with the teachings of our copending U.S. patent application Ser. No. 940,506, filed Dec. 11, 1986.

Slave 38 receives instructions from communication network 45 and controls centring and levelling motors 38a wherein the turntable 4 is displaced horizontally and/or pivotally for centring and levelling of a workpiece prior to performing measurements. The arrangements for centring and levelling are preferably in accordance with the disclosure of U.S. patent application Ser. No. 020,467 filed Mar. 2, 1987, now U.S. Pat. No. 4,731,934.

Microprocessor 40 receives data from gauging circuit 41 which receives and digitizes the signal output by the transducer 14 and from each of three interpolators 42, 44 and 46, which respectively receive signals from photoelectric transducers 23, 21 and 31 that detect the rotary movement of the turntable 4, the radial (horizontal) movement of the arm 10 and the vertical movement of the carriage 6 respectively. The interpolators function to provide data representing the precise positions of the turntable 4, arm 10 and carriage 6 to a resolution to a small fraction of the pitch of the optical gratings 27, 19 and 43. In the preferred embodiment, the interpolators provide resolution of the position of the transducer 14 in the radial (horizontal) direction to about 200 nanometers and in the axial (vertical) direction to about 500 nanometers and the rotational position of the workpiece can be resolved to about 3 arc seconds. The invention is not restricted to any specific resolution but it is preferred that resolution in the radial and vertical directions should be better than 1 micron and the rotational resolution should be better than 100 arc seconds, preferably better than 10 arc seconds. As already indicated, the transducer 14 preferably provides an output signal which resolves the position of the tip 12a of the stylus 12 to better than 20 nanometers, preferably 12 nanometers. Thus, high resolution data as to the deflection of the stylus 12 and the disposition of the transducer 14 in the radial (R) and vertical (Z) directions and the precise rotational position (O) of the turntable 4 is continually supplied to the microprocessor 40 during a measuring operation. This data is logged and stored by the microprocessor 40 and supplied to the host 22 for the performance of the required calculations of this data in accordance with programs stored in memory associated with the host 22.

Accordingly, and by way of summary, the architecture shown in FIG. 5 is such that the computers are arranged in three levels. The host 22 represents a first level and permits the input of instructions from an operator, the transfer of appropriate instructions to the master controller, and the reception of data from the data logger 40. The host 22 performs calculations on that data in order to provide the required information. The second level is represented by the master controller 30 which, upon receipt of instructions from the host 22, transmits, in accordance with programs stored in memory associated with the master controller 30, appropriate instructions to the various slaves, via the slave driver 30a as necessary to perform the operation instructed by the host. The slaves 32, 34, 36 and 38, and the data logger 40, represent the third level and carry out, in accordance with programs stored in memory associated with them respectively, the detailed functions necessary to perform the operations instructed by the master controller on the instructions of the host 22. Preferably the master controller is arranged so that successive instructions received from the host 22 may be stored simultaneously in different portions of the associated memory so that these instructions may be acted upon in turn by the master controller 30.

It has already been mentioned that the transducer 14 is a linear transducer. Thus, the signal which it outputs is representative of the degree of deflection of the stylus 12. However, as also already indicated, transducers providing the required high degree of resolution, for example resolution to better than 20 nanometers suffer from the problem that their range of operation i.e. the range of movement of the tip 12a of the stylus 12 within which a linear output signal with the required resolution is provided, is highly limited. Specifically, transducers with a suitable resolution may have a range of no more than 0.4 mm. To overcome this problem in accordance with an important preferred aspect of the invention, the master controller 30, upon receiving information that the signal from the gauging circuit 41 has exceeded a predetermined threshold, transmits an instruction to slave 34 to activate the motor 35 whereby the arm 11 is displaced until the signal output by the gauging circuit 14 is returned to a predetermined value, defined as a null value (which may, for example, by zero). Such instruction is sent when the transducer 14 is in a position in which the stylus 12 is deflectable in a radial plane with the arm 16 in either of the positions shown in FIG. 2. If the arm 16 is in the broken line position shown in FIG. 2, with the stylus 12 horizontal, and if the transducer 14 is rotated to the position in which the stylus is deflectable in a vertical plane (i.e. parallel to the axis of the turntable 4) the master controller 30 sends an instruction to the slave 36 to activate the motor 37 when the output from the gauging circuit 14 exceeds the predetermined threshold. Further, the master controller 30 is arranged so that, in appropriate circumstances, activation of the motor 33 for rotating the turntable may be effected under control of signals from the transducer 14 such that when the signal therefrom exceeds a predetermined thresold the motor 33 is actuated so that the workpiece is moved as necessary to permit the transducer 14 to follow the surface of the workpiece as it moves in the horizontal and/or vertical direction. Thus, in all of these cases, the stylus 12 is caused to follow the surface of the workpiece during rotation of the workpiece on the turntable 4. As a result high resolution measurements can be obtained while nevertheless accommodating large features of form since when such large features are encountered by the stylus the arm 10 or carriage 6 is moved as appropriate so that the tip of the stylus follows the workpiece surface without the stylus being deflected beyond its range of operation. The host computer 22 obtains the metrological information required, for example as to form or errors in form, both from the signals derived from the transducer 14 and the signals derived from the phototransducers 23, 21, 31 and the associated interpolators 42, 44 and 46.

Alternatively or in addition, the speed at which the stylus traverses the workpiece surface may be varied, by varying the speed of the motors driving the turntable 4 and/or the arm 10 and/or the carriage 6, so as to enable the gathering of data in a preferred manner for example to provide constant surface bandwidth whereby the results of measuring identical surface features at diferent radii are also identical and dependent only on the surface speed selected. In particular, it is preferred that data be taken at points on the surface of the workpiece at fixed distances apart and accordingly, with the arrangement under description, this may be achieved regardless of, for example, different curvatures of different portions of the surface, without varying the data collection rate by varying one or more of the speeds mentioned in order to compensate for the difference in curvatures, for example. In order to accomplish this, the master controller 30 reads positional data from the interpolators 42, 44 and 46 and the gauging circuit 41, the speed of the appropriate motors being varied in accordance with this received data and with programs stored in memory associated with the master controller 30.

Figure 6:
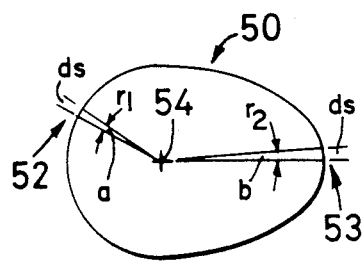
FIG. 6 is a diagram of a cam for illustrating a preferred function which may be carried out in accordance with a preferred aspect of the invention.

As an example of the foregoing, FIG. 6 illustrates a cam 50 whose profile is to be measured by taking measurements at positions spaced apart by a distance ds. At portion 52 of the cam where distance ds is at a radius r1 from the centre of rotation 54 and subtends at angle a, the speed of rotation of the turntable 4, in order to enable collection of data at a constant rate, will have to differ from that utilised when measuring portion 53 of the cam, where ds is at a radius r2 and subtends an angle b. Thus, the master controller has associated with it programs for varying the speed of rotation of the turntable 4 taking these parameters into account in order that data may be collected at a constant rate at constant incremental positions of the stylus on the surface being measured. To achieve this, the speed of rotation of the turntable may be controlled in accordance with the following equation:

$$\frac{d\theta}{dt} = \frac{1}{R} \sqrt{V^2 - \left(\frac{dS}{dt} + \frac{dR}{dt}\right)^2}$$

where V is the required constant speed of traverse of the transducer over the workpiece surface, S is the signal from the linear output transducer 14 and R is the signal derived by the interpolator 44 from the transducer 21 indicating the radial position of the transducer 14.

Figure 7:
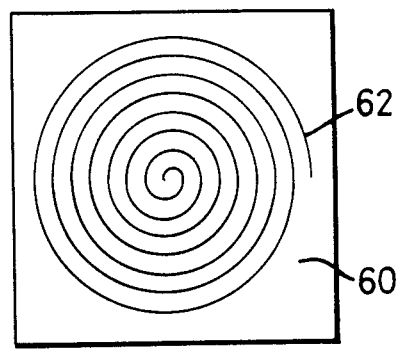
FIGS. 7, 8 and 9 are diagrams illustrating methods of measuring flatness, cylindricity and conicity respectively in accordance with further preferred aspects of the invention.

With reference to FIG. 7, a preferred operation for the measurement of flatness is illustrated. In FIG. 7, a surface 60 of a workpiece (not shown) placed upon the turntable 4 is traversed by the stylus 12 in a spiral path 62. This is achieved by causing the arm 10 to be moved radially inwardly or outwardly accordingly to whether the measurement is started near the centre or near the periphery of the surface 60, whilst rotating the turntable 4. In one preferred mode of operation, the speed of rotation of the turntable is varied, as a linear function of the distance of the stylus from the centre of rotation, in order that the linear speed of traverse of the stylus over the surface is maintained constant. Data from the stylus 12 is logged at fixed time or distance intervals. Other modes of operation are possible in which, for example, the speed of rotation is kept constant.

Figure 8:
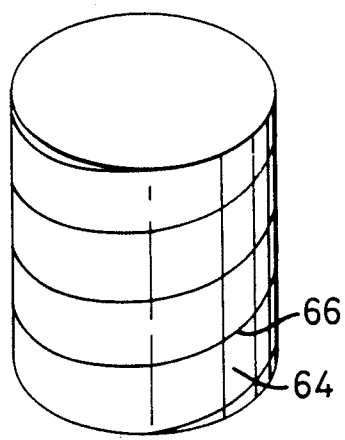

With reference to FIG. 8, cylindricity of a surface 64 is measured by causing the stylus 12 to traverse a spiral (helical) path 66. This is achieved, after centring and levelling, by rotation of the turntable 4 whilst moving the carriage 6 vertically. In this measurement, the speeds of movement are maintained constant and again data is logged at fixed time intervals, these fixed intervals again resulting in the logging of data at fixed incremental distances along the path of movement of a stylus over the surface. Movements are taken over a number of revolutions around the surface 64 i.e. the helix or spiral has multiple turn. It may be noted that the stylus may be caused to traverse a spiral or helical path over the cylindrical surface 64 for the purpose of determining the axis of the cylinder.

Figure 9:
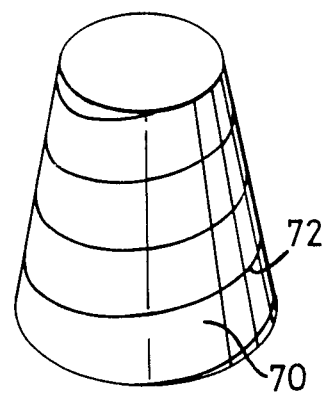

In the example of FIG. 9, conicity of a surface 70 is measured by causing the stylus 12 to traverse a spiral path 72 having several turns. This is achieved, after centring and levelling, by rotating the turntable 4 whilst moving the carriage 6 vertically and the arm 10 radially (horizontally). The radial movement is inwards if the stylus moves from a relatively wide portion to a relatively narrow portions of the surface 70 and vice versa. The radial movement of the arm 10 is controlled in dependence upon the magnitude of the signal output by the transducer 14 so that the stylus 12 is maintained in continuous contact with the conical surface 70 as the measurement progresses. Further, the angular velocity of the turntable 4 can be controlled as a linear function of the radial position of the arm 10 as indicated by transducer 44 so that the linear speed at which the stylus traverses the surface 70 is maintained constant. Data is logged at constant time intervals.

Although certain preferred methods of measurement have described, it should be understood that the machine may be programmed for carrying out a wide variety of measurements, such as surface roughness, roundness, straightness, flatness, squareness, taper, coaxiality, parallelism, size of regular and irregular shapes.

Where, in the preferred embodiment, the transducer position and/or the speeds of one or more of the motors are varied either in sequence or simultaneously so that the transducer follows the profile being measured and/or so that measurements may be taken at constant surface intervals measurements may be performed more rapidly and efficiently than in prior art apparatus.

We claim:

1. Metrological apparatus comprising rotatable member means for receiving a workpiece; first drive means for rotating said member means, sensor means for sensing the surface of a workpiece on the rotatable member means during rotation thereof, means for supporting said sensor for movement relative to said member means, second drive means for effecting said movement of said sensor means and digital computer means for receiving signals derived from said sensor, controlling relative movement between said workpiece and said sensor in response to said signals such that said sensor means follows curvature in said workpiece surface and said sensor traverses said workpiece surface at a speed which is substantially constant, and providing metrological data in dependence both on said signals and on said movement of said sensor.

2. Apparatus according to claim 1, wherein said supporting means includes means for supporting said sensor means for movement in a substantially radial direction relative to said rotatable member means.

3. Apparatus according to claim 2, wherein said sensor means includes means for sensing form of a workpiece in a radial plane relative to said rotatable member and said computer means includes means responsive to said signals derived from said sensor means for controlling said second drive means to move said sensor means in said substantially radial direction so that said sensor means follows said workpiece surface.

4. Apparatus according to claim 1, wherein said supporting means includes means for supporting said sensor means for movement in a substantially axial direction relative to said rotatable member means.

5. Apparatus according to claim 4, wherein said sensor means includes means for sensing form of a workpiece in a plane substantially parallel to the axis of said rotatable member and said computer means includes means for controlling said second drive means in response to said signals derived from said sensor means to move said sensor means in said substantially axial direction to cause said sensor means to follow said workpiece surface.

6. Apparatus according to claim 1, wherein said supporting means includes means for supporting said sensor means for movement in both substantially radial and substantially axial directions relative to said rotatable member means.

7. Apparatus according to claim 6, wherein said sensor means includes selectively operable means having a first condition and a second condition for sensing workpiece form in a radial plane in said first condition or sensing workpiece form in an axial plane in said second condition, and said computer means includes means for controlling the movement of the sensor means in the radial direction when said sensor means is in said first condition or in the axial direction when said sensor means is in said second condition.

8. Apparatus according to claim 7, wherein said sensor means comprises a stylus having a tip engageable with the workpiece surface and a transducer responsive to deflection of said stylus in a single plane to produce said signals, and means for rotating said transducer and stylus together for changing from said first condition to said second condition.

9. Apparatus according to claim 1, wherein said digital computer means includes means for controlling said first drive means in response to said signals derived from said sensor means such that said sensor follows said workpiece surface.

10. Apparatus according to claim 1, wherein said sensor means includes means for providing an output signal substantially linearly related to surface variations sensed thereby.

11. Apparatus according to claim 10, wherein said computer means includes means for controlling said second drive means to maintain said sensor means stationary until the output signal thereof exceeds a predetermined threshold.

12. Apparatus according to claim 10, wherein said computer means includes means for providing said metrological data by storing signals representing the position of the sensor means when the output thereof has a predetermined value.

13. Apparatus according to claim 1, wherein said sensor means has a resolution better than 20 nanometers.

14. Apparatus according to claim 13, wherein said sensor means can resolve to 12 nanometers.

15. Apparatus according to claim 14, wherein said sensor means is adapted to sense form variations of up to 0.4 mm.

16. Apparatus according to claim 1, wherein said computer means includes means for resolving the position of the sensor means in at least one direction to within 500 nanometers.

17. Apparatus according to claim 16, wherein the position of the sensor means in at least one direction is resolved to within 200 nanometers.

18. Apparatus according to claim 1, wherein said computer means includes means for resolving to within 5 arc seconds.

19. Apparatus according to claim 1, wherein the sensor means is adapted to resolve to less than 20 nanometers, and said computer means includes means for resolving the position of the sensor means in the radial and axial directions to within one micron and the rotary position of the workpiece receiving member means to within 100 arc seconds.

20. Apparatus according to claim 1, wherein the sensor is adapted to resolve to less than 20 nanometers, and said computer means includes means for resolving the position of the sensor in the radial direction to within 200 nanometers and in the axial direction to within 500 nanometers and the rotary position of the workpiece receiving member to within 5 arc seconds.

21. Apparatus according to claim 1, wherein said computer means includes means for recording positional data at substantially fixed time intervals during said substantially constant speed traverse.

22. Apparatus according to claim 1, including detector means for detecting respectively the rotary position of the workpiece receiving member and the position of the sensor, said computer means further being responsive to said detector means.

23. Apparatus according to claim 22, including interpolator means responsive to said detector means for deriving from said detector means positional data having a resolution higher than that provided by said detector means.

24. Apparatus according to claim 1, wherein said computer means comprises a plurality of slave computer means each for controlling a respective different said drive means, and master computer means for supplying instructions to said slave computers.

25. Apparatus according to claim 24 wherein said computer means includes an additional computer means for transferring information between said master computer means and said slave computer means.

26. Apparatus according to claim 24, wherein said computer means includes manually operable data input means for receiving manually input data and host computer means connected to said data input means for supplying to said master computer means instructions to perform specified measuring operations in response to data input by said manually operable data input means.

27. Apparatus according to claim 24, wherein said computer means comprises a further computer means for recording said metrological data.

28. Apparatus according to claim 1, wherein said computer means includes means for performing a cylindricity measurement by causing the sensor to traverse a helical path or paths over a workpiece.

29. Apparatus according to claim 1, wherein said computer means includes means for performing a conicity measurement by causing said sensor to traverse a spiral path over a workpiece surface.

30. Apparatus according to claim 1, wherein said computer means including means for performing a flatness measurement by causing said sensor to traverse a spiral path over a workpiece surface.

31. Metrological apparatus comprising workpiece support means for supporting a workpiece, sensor means for sensing the surface of a workpiece on said support means and providing data, a plurality of drive means for effecting relative movement between a workpiece on said support means and said sensor means so that said sensor means traverses the surface of the workpiece, host computer means having data input means for the input of instructions for performing a required measuring operation, said host computer means including means for performing calculations on data obtained with the aid of said sensor means, master computer means for receiving from said host computer instructions defining a metrological operation to be performed, and a plurality of slave computer means for controlling respective different ones of said drive means, said master computer means including means for sending to said slave computers instructions, dependent upon the metrological operation to be performed, to control said drive means for the performance of said operation.

32. Apparatus according to claim 31, further including additional computer means for logging data obtained during said metrological operation and for transmitting said logged data to said host computer means.

33. Apparatus according to claim 31, wherein said master computer means includes means for receiving information from the sensor means and information as to the position of the sensor.

34. Metrological apparatus comprising a rotatable member means for receiving a workpiece, first drive means for rotating said member means, sensor means for sensing the surface of a workpiece on the rotatable member means during rotation thereof, means for supporting said sensor means for movement relative to said workpiece receiving member means, second drive means for effecting said movement of said sensor, and digital computer means for receiving signals derived from said sensor means, providing metrological data and controlling said drive means in response to said signals derived from said sensor means to cause said sensor means to traverse the surface of the workpiece at a substantially constant speed.

35. Metrological apparatus comprising support means for supporting a workpiece, sensor means for sensing the surface of a workpiece on the support, drive means for effecting relative movement between the workpiece support and the sensor means so that the workpiece surface is traversed by the sensor means, means connected to the sensor for providing metrological data, and control means connected to the sensor and the drive means for controlling the drive means, said control means including means responsive to signals derived from the sensor means to effect a variation in speed of the drive means so that the sensor means follows curvature in the workpiece surface, said control means further including means for varying the speed of operation of said drive means so that the speed at which the sensor means traverses said surface is maintained substantially constant.

36. Metrological apparatus comprising:

a first support and means for supporting a workpiece on said first support;

a second support;

means for mounting said first and second supports for relative rotation about an axis of rotation through said first support;

a third support carried by said second support and movable relative to said second support; further drive means for effecting movement of said third support relative to said second support;

a transducer;

a stylus carried by said transducer for actuation thereof, said stylus having a tip, said tip being disposed substantially on a radius relative to said axis of rotation, said moement of said third support means relative to said second support means providing movement of said tip in directions parallel to and radially of said axis of rotation; rotary means for mounting said transducer on said third support for arcuate movement relative thereto between a first operative position in which said stylus extends substantially parallel to said axis of rotation and a second operative position in which said stylus extends substantially transverse to said axis of rotation, said arcuate movement being substantially centered at said stylus tip so that said tip is in substantially the same position for each of the operative positions of said transducer for a given position of said third support; and computer means for controlling said drive means to cause said apparatus to perform a metrological operation in which said stylus tip traverses a portion of a workpiece surface.

37. Apparatus according to claim 36, wherein said rotary means includes an element mounted on said third support for pivotal movement about a pivot axis at substantially 45° to a plane which is normal with respect to said axis of rotation, said transducer being carried by said element at a position spaced from said pivot axis so that pivotal movement of said element about said pivotal axis through 180° moves said transducer from said first operative position to said second operative position.

38. Apparatus according to claim 36, wherein said transducer includes means for sensing deflection of said stylus in a single plane relative to said transducer and wherein said transducer is rotatable to adjust the orientation of said single plane relative to a workpiece on said first support means.

* * * * *